United States Patent [19]

Mizuno et al.

[11] Patent Number: 5,224,001
[45] Date of Patent: Jun. 29, 1993

[54] MAGNETIC HEAD

[75] Inventors: Yasuo Mizuno; Masaki Ikeda; Akihiko Yoshida, all of Hirakata, Japan

[73] Assignee: Matsushita Electric Industrial Co., Ltd., Osaka, Japan

[21] Appl. No.: 863,609

[22] Filed: Apr. 6, 1992

Related U.S. Application Data

[63] Continuation-in-part of Ser. No. 618,373, Nov. 28, 1990, abandoned.

[30] Foreign Application Priority Data

Nov. 29, 1989 [JP] Japan .................. 1-309647

[51] Int. Cl.$^5$ .................................. G11B 5/127
[52] U.S. Cl. ........................ 360/125; 501/75; 501/76; 360/126; 360/127
[58] Field of Search .......... 501/75, 76; 360/120, 360/125, 126, 127; 29/603

[56] References Cited

U.S. PATENT DOCUMENTS

| | | | |
|---|---|---|---|
| 2,245,541 | 6/1941 | Goodwin | 501/75 |
| 3,418,156 | 12/1968 | Medert et al. | 501/75 |
| 3,723,835 | 3/1973 | Davis et al. | 501/75 |
| 4,158,081 | 6/1979 | Wexell | 501/75 |
| 4,711,018 | 12/1987 | Matsuzawa | 360/127 |
| 4,811,147 | 3/1989 | Kawai et al. | 360/127 |
| 4,972,285 | 11/1990 | Otomo et al. | 360/120 |
| 5,031,063 | 7/1991 | Hasegawa | 360/120 |
| 5,055,957 | 10/1991 | Daughenbaugh et al. | 360/120 |

FOREIGN PATENT DOCUMENTS

| | | |
|---|---|---|
| 58-501372 | 8/1983 | Japan . |
| 59-146951 | 8/1984 | Japan . |
| 59-195552 | 11/1984 | Japan . |
| 63-170240 | 7/1988 | Japan . |
| 1103078 | 2/1968 | United Kingdom . |

OTHER PUBLICATIONS

"Technical Study Reports of the Electronics, Information and Communication Society", MR-86-4, pp. 25-32, May 1986.

"Technical Study Reports of the Electronics, Information and Communication Society", MR-87-14, pp. 1-8, Aug. 1987.

"National Technical Report", vol. 37, No. 4, 498-505 (1991).

"Chemical Abstracts", vol. 95, No. 20 (Nov. 16, 1981), col. 174234f.

"Chemical Abstracts", vol. 111, No. 6 (Aug. 7, 1989), col. 44189h.

Primary Examiner—Mark L. Bell
Assistant Examiner—Deborah Jones
Attorney, Agent, or Firm—Wenderoth, Lind & Ponack

[57] ABSTRACT

A magnetic head comprising magnetic core halves which are sealed with a sealing glass which consists essentially of 10 to 25% by weight of $SiO_2$, 55 to 80% by weight of PbO, 1 to 15% by weight of CdO, 0 to 10% by weight of $B_2O_3$, 0 to 5% by weight of ZnO, 0 to 5% by weight of $Al_2O_3$, 0 to 5% by weight of $Na_2O$, and 0 to 10% by weight of $K_2O$, provided that a total content of $Na_2O$ and $K_2O$ does not exceed 10% by weight, has a coefficient of thermal expansion of from $90 \times 10^{-7}/°$ C. to $110 \times 10^{-7}/°$ C. in a temperature range between 30° C. and 300° C., a working temperature of 600° C. or lower and water resistance of the second class or higher, which glass is not deeply colored and is not devitrified during the assembly of the magnetic head.

5 Claims, 2 Drawing Sheets

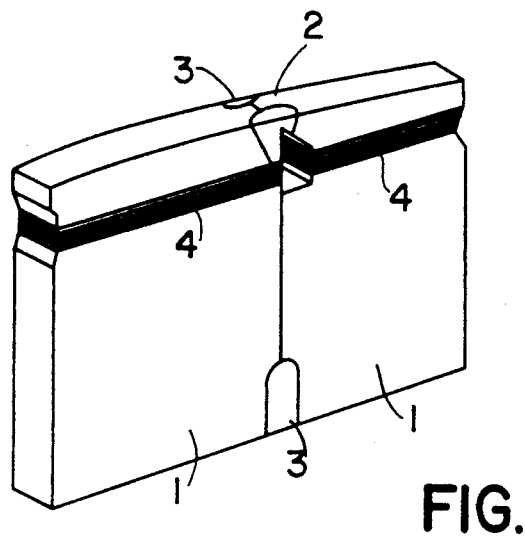
FIG. 2
FIG. 3
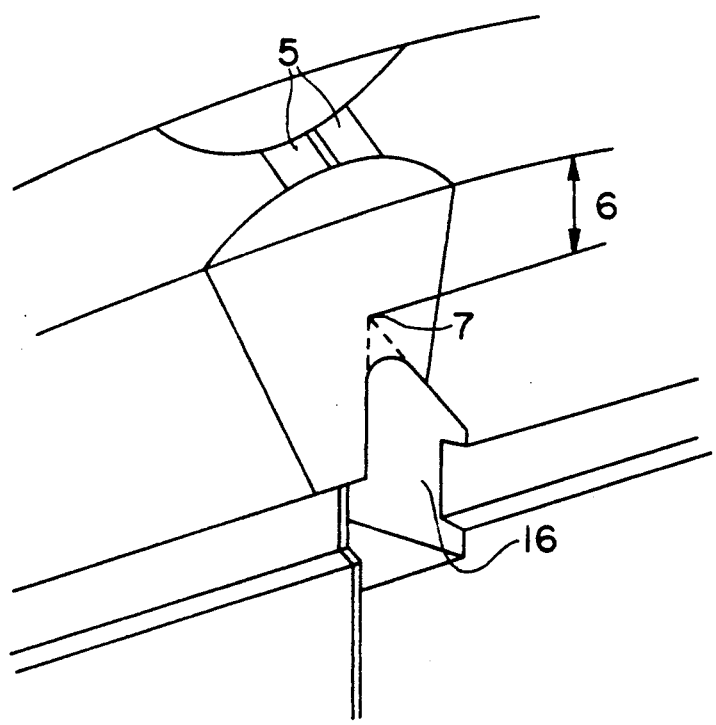

MAGNETIC HEAD

This application is a Continuation-in-Part application of Ser. No. 07/618,373 filed on Nov. 28, 1990.

BACKGROUND OF THE INVENTION

1. Field of the Invention

The present invention relates to a magnetic head using a specific sealing glass for assembling.

2. Description of the Related Art

With the progress of electronics, the need for various kinds of glass has been increased.

The use of a sealing glass will be explained by making reference to a sealing glass for a magnetic head. FIGS. 1A to 1K illustrate a typical process for producing a magnetic head.

First, a piece of ferrite is cut out from an ingot of ferrite (FIG. 1A). The piece of ferrite is abrased to form a rod having a suitable shape and size (FIG. 1B). As shown in FIG. 1C, grooves are formed by track processing. Over the grooves, a glass is molded (FIG. 1D) and excessive glass is removed by abrasing. After forming a groove for coiling, a gap surface is abrased (FIG. 1E). Then, a gap glass is sputtered on a bonding surface and a pair of ferrite pieces are bonded to form a gap (FIG. 1F). The bonded pieces are cut to form a chip (FIG. 1G) and sides of the chip are abrased to a suitable thickness (FIG. 1H). The chip is then adhered to a base (FIG. 1I), and a tape flying face is abrased (FIG. 1J). Finally, a wire is wound to finish a magnetic head (FIG. 1K).

As a material for the magnetic head, the ferrite has been most widely used. However, since the ferrite has a small saturation magnetic flux density, the magnetic head comprising the ferrite cannot be used in combination with a a high density recording medium such as a metal tape which has recently been developed because of magnetic saturation of the magnetic head. Then, as a substitute magnetic material for the ferrite, an amorphous alloy was developed and used for the production of a magnetic head which is assembled in a VTR used in broad casing stations or an S-VHS type VTR. For producing the magnetic head comprising the amorphous alloy, the amorphous alloy is sputtered between the steps of FIGS. 1B and 1C. However, since the amorphous alloy tends to be easily crystallized, a working temperature of the sealing glass used for assembling the magnetic head should be 500° C. or lower. To this end, a sealing glass containing a very large amount of PbO is used. In general such glass has small strength and poor water resistance.

Then, a superstructural nitride alloy as a substitute for the amorphous alloy was invented (see, for example, the Technical Study Reports of the Electronics, Information and Communication Society, MR-86-4, 87-14). Since the superstructural nitride alloy has a coefficient of thermal expansion of $105 \pm 5 \times 10^{-7}/°$ C. (30° to 300° C.) and a crystallization temperature of 600° C. or higher, the sealing glass containing a smaller amount of PbO can be used. Therefore, the strength and water resistance of the sealing glass are expected to be improved.

However, conventional glasses which can be processed at a temperature of 600° C. or higher are not suitable as sealing glasses for the magnetic head. For example, Japanese Patent Kokai Publication No. 501372/1983 discloses a glass which contains 62 to 72% by weight of PbO and has a working temperature of 530° C. But, its coefficient of thermal expansion is as small as $87 \times 10^{-7}/°$ C., it has poor water resistance because of the presence of $PbF_2$, it is easily devitrified because of the presence of $TiO_2$, and it is colored in dark brown because of the presence of $V_2O_5$.

Japanese Patent Kokai Publication No. 146951/1984 discloses a glass which contains 70 to 74% by weight of PbO, and has a viscosity of $10^6$ poises at 600° C. or lower and a coefficient of thermal expansion of 83 to $93 \times 10^{-7}/°$ C. Since, in general, the sealing glass should have a viscosity in the order of $10^4$ poises at the working temperature, the working temperature of this glass exceeds 600° C. In addition, the coefficient of thermal expansion is small.

When a coefficient of thermal expansion of the sealing glass is too small, a large tensile stress is generated in the substrate so that the chip is broken in the step (g) of the above process. When the coefficient of thermal expansion is too large a large tensile stress is generated in the glass so that the glass is broken.

When the glass has prior water resistance, the surface of the glass is denatured and the gap formation is insufficient in the step (f), so that the chip is broken in the step (g).

When the glass is colored or devitrified, the apex is not observed when the gap depth is adjusted to a defined depth.

When the working temperature exceeds 600° C., a super structure nitrogen alloy such as a Co-Nb-Zr-N alloy which is used as a magnetic material of the magnetic head is crystallized so that the magnetic head does not work.

Japanese Patent Kokai Publication No. 195552/1984 discloses a glass for thick coating a circuit which contains 65 to 75% by weight of PbO, and has a baking temperature of 560° C. or lower and a coefficient of thermal expansion of 65° to $85 \times 10^{-7}/°$ C. This glass has the small coefficient of thermal expansion and is colored in dark green because of the presence of $Cr_2O_3$.

Japanese Patent Kokai Publication No. 170240/1988 discloses a glass which contains 45 to 60% by weight of PbO, and has a working temperature of 550° C. and a coefficient of thermal expansion of 119 to $126 \times 10^{-7}/°$ C. Since this glass contains a comparatively large amount (5% by weight or more) of $Na_2O$, it has poor water resistance. In addition, its coefficient of thermal expansion is too large.

In view of the above state of the arts, the sealing glass to be used together with the superstructural nitride alloy should meet at least following requirements:

(1) Its coefficient of thermal expansion is close to that of the superstructural nitride alloy.
(2) Its working temperature is not higher than 600° C.
(3) It has good water resistance.
(4) It is not darkly colored and not devitrified during processing.

As a result of preliminary experiments on the coefficient of thermal expansion and water resistance, it was found that the glass having a coefficient of thermal expansion of from 90 to $110 \times 10^{-7}/°$ C. has good sealing properties with the superstructural nitride alloy, and that the glass should have the water resistance of at least "Second Class", preferably "First Class" when expressed according to the classes determined by the Japan Optical Glass Industries Association (Nippon Kogaku Garasu Kogyokai).

SUMMARY OF THE INVENTION

One object of the present invention is to provide a novel sealing glass which is suitable for sealing magnetic heads.

Another object of the present invention is to provide a magnetic head which is assembled using the novel sealing glass which has a comparatively lower working temperature, a coefficient of thermal expansion close to that of a magnetic material and good water resistance and which is not darkly colored or devitrified during processing.

According to the present invention, there are provided a magnetic head comprising magnetic core halves which are sealed with a sealing glass which consists essentially of:

10 to 25% by weight of $SiO_2$,
55 to 80% by weight of PbO,
1 to 15% by weight of CdO,
0 to 10% by weight of $B_2O_3$,
0 to 5% by weight of ZnO,
0 to 5% by weight of $Al_2O_3$,
0 to 5% by weight of $Na_2O$, and
0 to 10% by weight of $K_2O$ provided that a total content of $Na_2O$ and $K_2O$ does not exceed 10% by weight, has a coefficient of thermal expansion of from $90 \times 10^{-7}/°C$. to $110 \times 10^{-7}/°C$. in a temperature range between 30° C. and 300° C., a working temperature of 600° C. or lower, preferably not lower than 480° C. (minimum temperature) and water resistance of the second class or higher, is not deeply colored and is not devitrified during the assembly of the magnetic head.

Preferably, the sealing glass to be used according to the present invention consists essentially of:

10 to 20% by weight of $SiO_2$,
60 to 75% by weight of PbO,
1 to 10% by weight of CdO,
3 to 10% by weight of $B_2O_3$,
0 to 5% by weight of ZnO,
0 to 3% by weight of $Al_2O_3$,
0 to 3% by weight of $Na_2O$, and
1 to 5% by weight of $K_2O$ provided that a total content of $Na_2O$ and $K_2O$ is from 1 to 8% by weight.

The core half is preferably made of a super structure nitride alloy such as a Co-Nb-Zr-N alloy.

DESCRIPTION OF THE DRAWINGS

FIG. 2 is a perspective view of a magnetic head, and
FIG. 3 is an enlarged partial view of a magnetic head.

DETAILED DESCRIPTION OF THE INVENTION

Figure 1D:
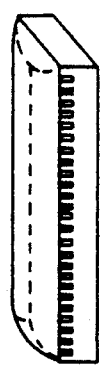
FIGS. 1A to 1K illustrate the steps for producing a magnetic head.
Figure 1C:
Figure 1H:
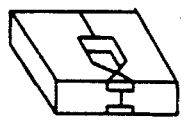
Figure 1G:
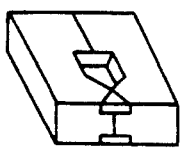
Figure 1K:
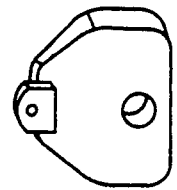
Figure 1B:
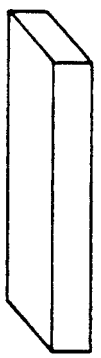
Figure 1F:
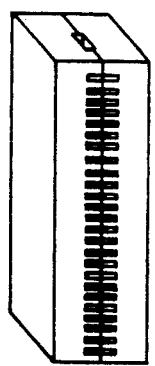
Figure 1J:
Figure 1A:
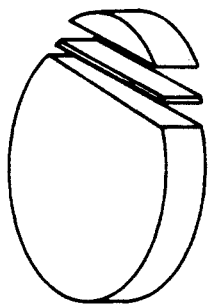
Figure 1E:
Figure 1I:
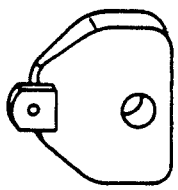

The water resistance of the sealing glass is measured and graded as follows:

Glass powder (particle size of 420 to 590 μm) of an amount corresponding to its specific gravity is charged in a platinum basket and immersed in 80 ml of a pure water having pH of 6.5 to 7.5 which is contained in a quartz made round flask. Then, the flask is heated on a boiling water bath for 60 minutes and a decreased weight percentage of the glass is measured and graded as follow:

| Class | Decreased weight (% by weight) |
|---|---|
| 1 | $\leq 0.04$ |
| 2 | 0.05–0.09 |
| 3 | 0.10–0.24 |
| 4 | 0.25–0.59 |
| 5 | 0.60–1.09 |
| 6 | $1.10 \leq$ |

This grading is determined by the Japan Optical glass Industries Association.

The feature that "a glass is not colored" intends to mean that the glass has no color by the inspection with naked eyes.

The material and structure of the magnetic head of the present invention may be the same as those of the conventional magnetic head except that the above novel sealing glass is used for assembling.

For example, the magnetic head core half is made of a ferrite or a magnetic material which is made of a magnetic alloy having a high magnetic permeability and saturation magnetic flux density (e.g. alloy of Co-Nb-Zr-N) and formed on a substrate.

Table shows the compositions of the glasses of the Sample Nos. 1 to 25 and their properties such as coefficients of thermal expansion, working temperatures, water resistance and total evaluation.

The coefficient of thermal expansion is measured between 30° and 300° C. The working temperature is a temperature at which the glass is fully expanded when the glass is drawn to a fiber having a diameter of 1 mm and a length of 25 mm and placed on a piece of ferrite having a width of 2.6 mm and a length of 25 mm. Water resistance is expressed in terms of "Class" determined by the Japan Optical glass Industries Association.

TABLE

| | Sample No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Composition (wt. %) | | | | | | | | | | | | | |
| $SiO_2$ | 5 | 10 | 15 | 20 | 25 | 30 | 18 | 15 | 3 | 10 | 10 | 10 | 10 |
| $B_2O_3$ | 8 | 8 | 8 | 8 | 8 | 8 | | 3 | 15 | 8 | 8 | 8 | 8 |
| PbO | 80 | 75 | 70 | 65 | 60 | 55 | 75 | 75 | 75 | 70 | 65 | 77 | 72 |
| ZnO | | | | | | | | | | 5 | 10 | | |
| $Al_2O_3$ | 2 | 2 | 2 | 2 | 2 | 2 | 2 | 2 | 2 | 2 | 2 | | 5 |
| $Na_2O$ | | | | | | | | | | | | | |
| $K_2O$ | 2 | 2 | 2 | 2 | 2 | 2 | 2 | 2 | 2 | 2 | 2 | 2 | 2 |
| CdO | 3 | 3 | 3 | 3 | 3 | 3 | 3 | 3 | 3 | 3 | 3 | 3 | 3 |
| Coefficient of thermal expansion ($\times 10^{-7}/°C$.) | 112 | 104 | 98 | 93 | 89 | 81 | 105 | 105 | 106 | 100 | 88 | 106 | 89 |
| Working temp. (°C.) | 500 | 520 | 540 | 560 | 590 | 630 | 560 | 540 | 500 | 530 | 570 | 510 | 580 |
| Water resistance | 2 | 1 | 1 | 1 | 1 | 1 | 2 | 1 | 3 | 1 | 1 | 1 | 1 |

TABLE-continued

| (Class) Total evaluation | X | OO | OO | OO | O | X | O | OO | X | OO | X | OO | O |
|---|---|---|---|---|---|---|---|---|---|---|---|---|---|
| | Sample No. | | | | | | | | | | | | |
| | 14 | 15 | 16 | 17 | 18 | 19 | 20 | 21 | 22 | 23 | 24 | 25 |
| Composition (wt. %) | | | | | | | | | | | | |
| $SiO_2$ | 10 | 10 | 10 | 10 | 10 | 10 | 10 | 10 | 10 | 10 | 10 | 10 |
| $B_2O_3$ | 8 | 8 | 8 | 8 | 8 | 8 | 8 | 8 | 8 | 8 | 8 | 8 |
| PbO | 67 | 77 | 72 | 67 | 62 | 70 | 65 | 78 | 73 | 68 | 63 | 58 |
| ZnO | | | | | | | | | | | | |
| $Al_2O_3$ | 10 | 2 | 2 | 2 | 2 | 2 | 2 | 2 | 2 | 2 | 2 | 2 |
| $Na_2O$ | | | | | | 5 | 10 | | | | | |
| $K_2O$ | 2 | | 5 | 10 | 15 | 2 | 2 | 2 | 2 | 2 | 2 | 2 |
| CdO | 3 | 3 | 3 | 3 | 3 | 3 | 3 | | 5 | 10 | 15 | 20 |
| Coefficient of thermal expansion ($\times 10^{-7}$/°C.) | 86 | 104 | 107 | 111 | 117 | 109 | 114 | 110 | 101 | 92 | 89 | 85 |
| Working temp. (°C.) | 630 | 490 | 500 | 480 | 460 | 490 | 470 | 510 | 530 | 570 | 600 | 640 |
| Water resistance (Class) | 1 | 2 | 1 | 2 | 3 | 2 | 3 | 2 | 1 | 1 | 1 | 1 |
| Total evaluation | X | O | OO | O | X | O | X | O | OO | OO | O | X |

In the Sample Nos. 1 to 6, contents of $SiO_2$ and PbO were changed. As the content of $SiO_2$ decreased, the coefficient of thermal expansion increased and the water resistance became worse. When the content of $SiO_2$ increased, the coefficient of thermal expansion decreased and the working temperature exceeded 600° C.

In the Sample Nos. 7, 8 and 9, a content of $B_2O_3$ was changed. When the content of $B_2O_3$ was too small or too large, the water resistance was deteriorated.

In the Sample Nos. 10 and 11, a content of ZnO was changed. When this content was too large, the coefficient of thermal expansion was too small.

In the Sample Nos. 12, 13 and 14, a content of $Al_2O_3$ was changed. When this content was too large, the coefficient of thermal expansion was too small, and the working temperature exceeded 600° C.

In the Sample Nos. 15 to 18, a content of $K_2O$ was changed. When this content was too large, the coefficient of thermal expansion was too large, and the water resistance was deteriorated.

In the Sample Nos. 19 and 20, a content of $Na_2O$ was changed. When this content was too large, the water resistance was deteriorated.

As understood from the results of the Sample Nos. 15 to 20, when the total content of $Na_2O$ and $K_2O$ exceeded 10% by weight, the coefficient of thermal expansion was too large and the water resistance was deteriorated.

In the Sample Nos. 21 to 25, a content of CdO was changed. When this content was too large, the coefficient of thermal expansion was too large, and the working temperature exceeded 600° C.

The sealing glass to be used in the present invention has the coefficient of thermal expansion of from 90 to $110 \times 10^{-7}$/° C. and improved water resistance. To the sealing glass, $As_2O_3$ for refining or other conventionally used material(s) may be added in a small amount.

EXAMPLES

Using the glass of the Sample No. 4 shown in Table 1, a magnetic head of FIG. 3 was assembled. As an amorphous alloy, a Co-Nb-Zr-N film which is disclosed in National Technical Report, 37 (1991) 498, the disclosure of which is hereby incorporated by reference, was used, and as the substrate, a Mn-Zn ferrite was used.

The glass was not deteriorated by water and had good transparency so that an apex was clearly observed.

What is claimed is:

1. A magnetic head comprising magnetic core halves which are sealed with a sealing glass which consists essentially of:

10 to 25% by weight of $SiO_2$,
    55 to 80% by weight of PbO,
    1 to 15% by weight of CdO,
    0 to 10% by weight of $B_2O_3$,
    0 to 5% by weight of ZnO,
    0 to 5% by weight of $Al_2O_3$,
    0 to 5% by weight of $Na_2O$, and
    0 to 10% by weight of $K_2O$ provided that a total content of $Na_2O$ and $K_2O$ does not exceed 10% by weight, has a coefficient of thermal expansion of from $90 \times 10^{-7}$/° C. to $110 \times 10^{-7}$/° C. in a temperature range between 30° C. and 300° C., a working temperature of 600° C. or lower, and water resistance of the second class or higher, is not deeply colored and is not devitrified during the assembly of the magnetic head.

2. The magnetic head according to claim 1, wherein said sealing glass consists essentially of:

10 to 20% by weight of $SiO_2$,
    60 to 75% by weight of PbO,
    1 to 10% by weight of CdO,
    3 to 10% by weight of $B_2O_3$,
    0 to 5% by weight of ZnO,
    0 to 3% by weight of $Al_2O_3$,
    0 to 3% by weight of $Na_2O$, and
    1 to 5% by weight of $K_2O$ provided that a total content of $Na_2O$ and $K_2O$ is from 1 to 8% by weight.

3. The magnetic head according to claim 1, wherein said core half is made of a super structured nitride alloy.

4. The magnetic head according to claim 3, wherein said super structured nitride alloy is a Co-Nb-Zr-N alloy.

5. The magnetic head according to claim 1, wherein said sealing glass has a working temperature of not lower than 480° C.

* * * * *